Jan. 28, 1936.    E. H. MESSITER    2,029,271
CONVEYER WEIGHING APPARATUS
Filed Sept. 1, 1928
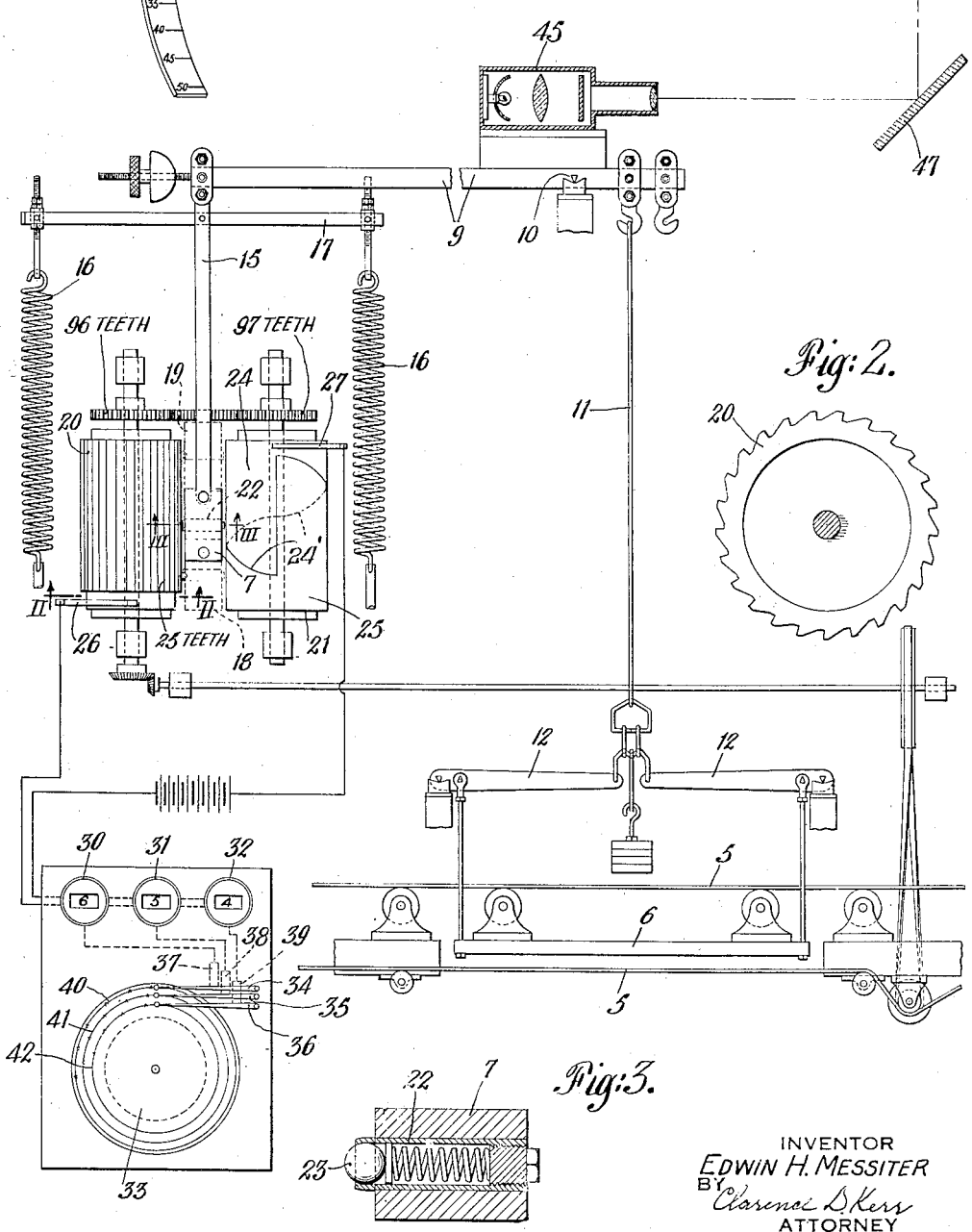
INVENTOR
EDWIN H. MESSITER
BY Clarence D. Kerr
ATTORNEY Patented Jan. 28, 1936

2,029,271

UNITED STATES PATENT OFFICE 2,029,271

CONVEYER WEIGHING APPARATUS

Edwin H. Messiter, Jersey City, N. J., assignor, by mesne assignments, to Chatillon-Schaefer Corporation, New York, N. Y., a corporation of Delaware Application September 1, 1928, Serial No. 303,481

15 Claims. (Cl. 235—61)

The present invention has been developed in connection with an automatic conveyer apparatus, in which provision is made for weighing material carried by a moving conveyer and for suitably indicating the total weight of material carried, the object sought in this particular mechanism being to provide improved means for accurately weighing and integrating the weight of material carried.

For convenience in the disclosure of the invention, such an embodiment will be described, but it will be understood that the particular description is illustrative merely and is not intended as defining the limits of the invention, which may be variously applied. For the purpose of the description reference should be had to the accompanying drawing forming a part hereof and in which—

Figure 1 is a diagrammatic view of an automatic conveyer weighing apparatus embodying the invention, Figure 2 is an enlarged end view of one of the contact cylinders taken on the line II—II of Fig. 1, and Figure 3 is a sectional view of the yieldable intermediate contact member taken on the line III—III of Fig. 1.

The apparatus shown for the purpose of illustrating the principles of the invention comprises a weighing mechanism responsive to the weight of a section of the conveyer with the material thereon, a counter, and impulse mechanism arranged to transmit to said counter actuating impulses, the number of which impulses is proportional to the weight passing over the weighing frame.

In the form shown a length of the moving belt conveyer 5 is supported on a vertically movable weighing frame 6 similar to that shown in Letters Patent No. 1,251,680, granted to me January 1, 1918. A follower or weight responsive member 7 is connected to the weighing frame to be moved thereby through the connections shown, as more fully explained hereinafter, and its position will correspond at all times to the weight of the section of the conveyer supported by the frame and the material thereon.

It is desirable that the member 7 shall have a substantially greater range of movement than the vertical movement of the weighing frame 6. The connections between the weighing frame 6 and the member 7 comprise a weighing arm 9 supported on a suitable knife edge 10 and connected as by a tension rod 11 to levers 12 which are suitably connected to the weighing frame.

The other end of the weighing arm 9 is connected by a suitable tension member 15 to the vertically movable follower 7 the latter being pivotally connected as shown to the lower end of member 15. The free end of the weighing arm 9 is resiliently held down to balance the weight of the weighing frame 6 by a pair of springs 16 connected to a cross-bar 17 carried by the tension member 15.

If there is no load on the conveyer the member 7 will take a zero position as indicated in dotted lines at 18 in Fig. 1, whereas, under the conditions of full load the indicator will take the upper position as shown in dotted lines at 19. At all times the distance of the indicator from its zero position will be proportional to the weight of the material on the portion of the conveyer supported by the weighing frame.

The counter actuating mechanism may comprise two rotatable drums 20, 21 actuated by the moving conveyer and at a speed proportional to the speed thereof, these drums being arranged to cooperate with the weight responsive member 7 to transmit impulses, the number of which during each revolution of the drums will depend upon the position of said member 7. As shown, the drum 20 is formed with a fluted or cam surface designed to cooperate with the member 7 and with an operative area 24 of variable width on the drum 21. The mechanism may be electrical and when of this character the operative area 24 may be of an electrical conducting material while the remainder of the drum surface 25 is of insulating material. The line 24' serves to indicate the line of separation between the conducting and non-conducting portions of the drum. The portion of the drum above the line 24' in Figure 1 may be the conducting or operative area while the portion below the line may be non-conducting. The curve described by the line 24' will be more or less spiral in form and will bear a calibrated relation to the movements of the indicator 7 in response to the load on the frame 6. The circuit closing member 22 of the carrier 7 is so constructed that during rotation of the drums 20, 21, it may yield to prevent cramping but proper contact with both drums is assured. As shown, it comprises a sleeve which may be rigidly secured in the carrier 7 since the carrier 7 can move to the right and left as much as necessary in the proper making of the contacts. A spring pressed ball 23 yieldably engages the drum 20 while a rigid plug in the opposite end of the sleeve is positioned to engage the drum 21. As shown, the two drums are connected in an electric circuit which operates a counter mechanism by transmitting repeated impulses thereto. The contact brush 26 engages the drum 20 and a similar brush 27 engages the operative portion 24 of the drum 21. When the circuit closing member 22 is moved against the surface of the drum 21 by the cam surface of the drum 20, it will engage either a portion of the conducting surface 24 to close the electric circuit, or it will engage the insulating surface 25 and will have no effect on the electric circuit.

Each time that the circuit closing member 22 engages the conducting area 24, a circuit will be closed through the circuit closing member and both drums, and since the drums both rotate, the circuits will be closed at spaced points on the conducting area 24 of the drum 21 in a line transversely of this surface, i. e., around the circumference of the drum, the position of the line depending upon the position of the weight responsive member 7. If the two drums rotate at the same speed or in such ratio of speeds that the circuit closing member 22 engages the operative area 24 at the same points during successive rotations of the drums, then the sensitiveness or accuracy of the apparatus will be limited as an increase of even quite a substantial percentage of weight would not move the follower 7 far enough upward to increase the number of operative contacts made with each revolution.

In order to provide greater accuracy arrangement is made whereby the points of contact between the circuit closing member 22 and the drum 21 differ during successive revolutions. If then the width of the conducting area at a given point is, for example, five and one-half times the distance between successive contact points on the drum 21, then during half of the revolutions five operative contacts would be made against the conducting area and during the remainder of the revolutions six contacts would be made, the total number, therefore, of contacts made during a large number of revolutions would give an accurate indication of the weight carrier. In the particular apparatus shown the drum 20 has twenty-five operative cam surfaces and the drums 20 and 21 are driven by gears having respectively ninety-six and ninety-seven teeth.

By making the numbers of teeth on the two operating gears thus relatively prime to each other and to the number of cam surfaces on the drum 20, the points of contact of the circuit closing member 22 with the drum 21 will so vary during successive revolutions as to obtain the desired accuracy in the operation of the mechanism.

The counter mechanism may be of any suitable or desired type and may readily be so graduated as to indicate the number of pounds of material which have passed over the conveyer. As shown, it comprises three dials 30, 31, and 32. Any well known electrically operated step-by-step counter actuating mechanism may be employed to drive the dial 32. For example the mechanism shown in Figures 10 and 11 of the patent to Hollerith, No. 430,804 may be used for this purpose. The dials 31 and 30 may be connected with the dial 32 through any suitable form of transfer mechanism.

It is sometimes desirable to provide means for making a record of the amount of material carried by the conveyer and the time when the same is carried. To this end a recording mechanism is provided having a rotatable dial 35 operated by a suitable clock and a number of automatically operated pens 34, 35, 36 are connected to the counter mechanism to be actuated to make a mark on the dial each time that one of the counter dials 30, 31, 32 advances one step. This is diagrammatically illustrated in Fig. 1 in which are shown connections between the respective dials 30, 31, 32 and magnets 37, 38, 39 operating the pens 34, 35, 36 against the face of the dial. The recorded markings 40, 41, 42 indicate the time and amounts of material transferred by the conveyer.

The weight of material passing on the conveyer at any particular time may be indicated also by visual means. As illustrated, a suitable projector 45 is carried by the weighing beam 9 and arranged to project a beam of light on to a suitable graduated scale 46, said light being reflected by the stationary mirrors 47 and 48. In order to facilitate exact reading of the weight being carried, the projecting mechanism is adapted to project an image of a scale 49 having a vernier relation to the scale 46.

The foregoing description is illustrative merely. The invention may be variously embodied without departing from the spirit of the invention as defined in the appended claims.

I claim:

1. Apparatus of the character described which comprises an element having a conducting surface of variable width forming a portion of an electric circuit, a contact element adapted to periodically engage said surface to close said circuit, means for shifting said surface relative to said contact, means for intermittently forcing said contact into engagement with said surface, said last two recited means being operated out of synchronism, integrating means in said electric circuit operated by said engagements, and means operated in accordance with a function to be integrated for shifting said contact relative to said surface in a direction transverse to said first mentioned relative movement so as to vary the number of contacts made with said surface during a given time interval.

2. In integrating apparatus, the combination with an element having a surface of variable width, of a cooperating means arranged to repeatedly make series of contacts with said surface of variable width along a line, controlled means for varying the position of a portion of said cooperating means relative to said surface in accordance with a variable of a function to be integrated, and another portion of said first mentioned means being adapted to vary the points at which said repeated contacts are made longitudinally along said line, substantially as described.

3. In integrating apparatus, the combination with an element having a surface of variable width, of a cooperating means arranged to repeatedly make a series of contacts with said surface of variable width along a line, means for continuously varying the position of a portion of said cooperating means relative to said surface in accordance with a variable of a function to be integrated, and means for registering the making of the series of contacts with said area, substantially as described.

4. Integrating apparatus comprising, in combination, a plurality of rotatable members, one of said rotatable members being provided with a conducting surface of variable width, and means controlled by the other of said members for closing a circuit through said conducting member at a plurality of points during each revolution thereof.

5. An apparatus as defined in claim 4 in which the rotatable members are geared to rotate at different speeds.

6. Apparatus as defined in claim 4 in which the rotatable members are geared to rotate at different speeds the gearing being such that the ratio of the speeds of the two rotatable members is substantially prime.

7. In an integrating apparatus a member continuously adjustable in accordance with a variable of a function to be integrated, counter mechanism, means cooperating with said member and said counter mechanism, and means controlled in accordance with another quantity in the function to be integrated for intermittently operating said member to act on said first named means and thereby control actuation of the counter mechanism.

8. In an integrating apparatus a member continuously adjustable in accordance with a variable of a function to be integrated, counter mechanism, impulse mechanism operated in accordance with another quantity in the function to be integrated, said impulse mechanism being arranged to intermittently operate said member and thereby cause actuation of the counter mechanism, and means adapted to render the impulse mechanism alternately effective and ineffective, for variable periods depending upon the adjustment of said member.

9. In an integrating apparatus a member continuously adjustable in accordance with a variable of a function to be integrated, counter mechanism, means operated in accordance with another quantity in the function to be integrated for initiating a predetermined number of counter mechanism operating impulses, and means coacting with the member for transmitting to the counter mechanism a greater or lesser number of said impulses, depending upon the adjustment of said member.

10. Integrating apparatus comprising an element adjustable continuously in accordance with a variable of a function to be integrated, a pair of members cooperating with said element, means for synchronously moving said members relative to the element at speeds corresponding with another quantity in the function to be integrated, counter mechanism, and means controlled by said members and element for transmitting intermittent, counter-mechanism actuating impulses in accordance with the function to be integrated.

11. Integrating apparatus comprising an element adjustable continuously in accordance with a variable of a function to be integrated, a pair of members cooperating with said element, means for synchronously moving said members relative to the element at speeds corresponding with another quantity in the function to be integrated, counter mechanism, and means controlled by said members and element for transmitting intermittent, counter-mechanism actuating impulses in accordance with the function to be integrated, one of said members tending to produce a continuous series of intermittent impulses and the other member selecting a portion of said continuous series to become effective.

12. Integrating apparatus comprising an element adjustable continuously in accordance with a variable of a function to be integrated, a pair of members cooperating with said element, means for synchronously moving said members relative to the element at speeds corresponding with another quantity in the function to be integrated, counter mechanism, and means controlled by said members and element for transmitting intermittent, counter-mechanism actuating impulses in accordance with the function to be integrated, said members being moved relative to said element at different speeds bearing a prime relationship to each other.

13. Integrating apparatus comprising an element adjustable continuously in accordance with a variable of a function to be integrated, a pair of members cooperating with said element, means for synchronously moving said members relative to the element at speeds corresponding with another quantity in the function to be integrated, counter mechanism, and means controlled by said members and element for transmitting intermittent, counter-mechanism actuating impulses in accordance with the function to be integrated, one of said members tending to produce a continuous series of intermittent impulses and the other member selecting a portion of said continuous series to become effective, said members being moved relative to said element at different speeds bearing a prime relationship to each other.

14. Integrating apparatus comprising an element adjustable continuously in accordance with a variable of a function to be integrated, a pair of members cooperating with said element, means for synchronously moving said members relative to the element at speeds corresponding with another quantity in the function to be integrated, counter mechanism, and means controlled by said members and element for transmitting intermittent, counter-mechanism actuating impulses in accordance with the function to be integrated, one of said members intermittently forcing said element against the other member, said other member having operative and inoperative areas, an impulse being transmitted only when said element strikes an operative area.

15. Apparatus of the character described which comprises an element having a conducting surface forming a portion of an electric circuit, a contact element adapted to periodically engage said surface to close said circuit, means for shifting said surface relative to said contact at a variable speed in accordance with one function to be integrated, means for intermittently forcing said contact into engagement with said surface, integrating means in said electric circuit operated upon each of said engagements, and means operated in accordance with a second function to be integrated for controlling the number of contacts made with said surface during a given time interval.

EDWIN H. MESSITER.